US011220001B2

(12) United States Patent
Logemann

(10) Patent No.: US 11,220,001 B2
(45) Date of Patent: Jan. 11, 2022

(54) ARTICULATED ROBOT

(71) Applicant: BROETJE-AUTOMATION GMBH, Rastede (DE)

(72) Inventor: Torsten Logemann, Wiefelstede (DE)

(73) Assignee: Broetje-Automation GmbH, Rastede (DE)

(*) Notice: Subject to any disclaimer, the term of this patent is extended or adjusted under 35 U.S.C. 154(b) by 33 days.

(21) Appl. No.: 16/342,709

(22) PCT Filed: Jul. 27, 2017

(86) PCT No.: PCT/EP2017/068973
§ 371 (c)(1),
(2) Date: May 3, 2019

(87) PCT Pub. No.: WO2018/065137
PCT Pub. Date: Apr. 12, 2018

(65) Prior Publication Data
US 2019/0308314 A1 Oct. 10, 2019

(30) Foreign Application Priority Data

Oct. 4, 2016 (DE) .................... 10 2016 118 785.2

(51) Int. Cl.
*B25J 9/04* (2006.01)
*B25J 9/06* (2006.01)
(Continued)

(52) U.S. Cl.
CPC .............. *B25J 9/047* (2013.01); *B25J 9/06* (2013.01); *B25J 9/106* (2013.01); *B25J 9/123* (2013.01)

(58) Field of Classification Search
CPC ..... B25J 9/047; B25J 9/06; B25J 9/106; B25J 9/123; B25J 9/046; B65H 9/046
See application file for complete search history.

(56) References Cited

U.S. PATENT DOCUMENTS 4,482,288 A * 11/1984 Rovetta .................... B25J 9/046
414/4
4,496,279 A 1/1985 Langer
(Continued)

FOREIGN PATENT DOCUMENTS

DE        3231249        3/1983
DE     102013018857 W    5/2015
(Continued)

OTHER PUBLICATIONS

"German Serach Report," for German Patent Application No. 102016118785.2 dated May 17, 2017 (7 pages).
(Continued)

*Primary Examiner* — Jeremy R Severson
(74) *Attorney, Agent, or Firm* — Pauly, DeVries Smith & Deffner LLC

(57) ABSTRACT

The disclosure relates to an articulated robot having a serial kinematic mechanism for positioning an end effector, the kinematic mechanism having at least one part kinematic mechanism with a robot joint, with a robot limb mounted upstream of the robot joint, and with a robot limb mounted downstream of the robot joint. The at least one part kinematic mechanism has a linear drive, with a drive element, and a coupler with two coupler joints which are spaced apart from one another along the coupler extent, wherein the linear drive is arranged on a first robot limb of the part kinematic mechanism, and wherein the coupler is articulated on one side on the drive element of the linear drive and on the other side on the second robot limb of the part kinematic mechanism, spaced apart from the geometric axis of the robot joint of the part kinematic mechanism.

20 Claims, 3 Drawing Sheets

(51) Int. Cl.
 *B25J 9/10* (2006.01)
 *B25J 9/12* (2006.01)

(56) References Cited

U.S. PATENT DOCUMENTS

| | | | | |
|---|---|---|---|---|
| 4,986,724 A | * | 1/1991 | Steinmetz | B25J 9/046 |
| | | | | 414/729 |
| 10,118,293 B2 | * | 11/2018 | Wanner | B25J 9/106 |
| 2003/0145672 A1 | * | 8/2003 | Husistein | F16H 25/2204 |
| | | | | 74/424.85 |

FOREIGN PATENT DOCUMENTS

| | | |
|---|---|---|
| EP | 0084249 | 7/1983 |
| EP | 0243362 | 11/1987 |
| WO | 2018065137 | 4/2018 |

OTHER PUBLICATIONS

"International Preliminary Reporton Patentability," for PCT Application No. PCT/EP2017/068973 dated Apr. 18, 2019 (7 pages). English Translation.

"International Search Report and Written Opinion," for PCT Application No. PCT/EP2017/068973 dated Dec. 8, 2017 (11 pages).

* cited by examiner

ARTICULATED ROBOT

CROSS-REFERENCE TO RELATED APPLICATIONS

This application is a national stage application under 35 U.S.C. 371 of International Patent Application Serial No. PCT/EP2017/068973, entitled "Articulated Robot," filed Jul. 27, 2017, which claims priority from German Patent Application No. DE 10 2016 118 785.2, filed Oct. 4, 2016, the disclosure of which is incorporated herein by reference.

FIELD OF THE TECHNOLOGY

The disclosure relates to an articulated robot having a serial kinematic mechanism for positioning an end effector.

BACKGROUND

The articulated robot at issue is used in different areas of automation technology. In the present case, automation tasks relating to the manufacture of structural components of aircraft are at the forefront, in the case of which process forces occur on the end effector.

The positioning of the end effector under process forces makes particular demands of the kinematic mechanism of the articulated robot. A factor which influences the positioning accuracy is the tolerance-induced play in the kinematic mechanism of the articulated robot, which play can be reduced by way of the specification of narrow tolerance ranges, by way of bracing drive axles, or the like. Another aspect which is at the forefront here is the rigidity of the kinematic mechanism of the articulated robot. In the case of insufficient rigidity of the kinematic mechanism, process forces can lead to an undesired deviation in the positioning of the end effector.

The rigidity of the kinematic mechanism of the articulated robot is determined substantially by way of the drive train which brings about the adjustment of the kinematic mechanism. The drive train which as a rule has a plurality of part sections comprising a drive motor and at least one transmission which is connected downstream of the drive motor has to counteract the process forces in such a way that deviations which are as small as possible result in the positioning of the end effector. This in turn makes additional demands on the rigidity of the drive train.

SUMMARY

The disclosure is based on the problem of specifying an articulated robot having a serial kinematic mechanism for positioning an end effector, which articulated robot has a high rigidity with regard to process forces which occur on the end effector.

It is assumed first of all that the kinematic mechanism of the articulated robot has at least one part kinematic mechanism with a robot joint, with a robot limb which is mounted upstream of the robot joint, and with a robot limb which is mounted downstream of the robot joint.

The fundamental consideration is then essentially that the equipping of the drive train with a linear drive and a coupler which is assigned to the linear drive with a suitable design can achieve a situation where the process forces which act on the end effector and exert a torque on the relevant robot joint generate only comparatively small forces on the linear drive along its linear axis. According to the proposal, this design is selected in such a way that the at least one part kinematic mechanism has a linear drive with a drive element which can be adjusted along a linear axis and a coupler with two coupler joints which are spaced apart from one another along the coupler extent, the linear drive being arranged on a first robot limb of the above two robot limbs of the part kinematic mechanism which are mounted upstream and downstream, and the coupler being articulated on one side on the drive element of the linear drive and on the other side on the second, remaining robot limb of the above two robot limbs of the part kinematic mechanism which are mounted upstream and downstream, spaced apart from the robot joint of the part kinematic mechanism.

Various embodiments include a spindle/spindle nut drive in the case of the linear drive, the geometric spindle axis of the spindle lying in a stationary manner on the first robot limb of the part kinematic mechanism in the case of various embodiments disclosed herein. This simplifies the mounting of the spindle and therefore reduces the manufacturing costs.

In the present case, in accordance with various embodiments the drive element of the longitudinal guide is guided along in a guide direction on the first robot limb in one variant separately from the linear drive. It can therefore be achieved in the case of an above spindle/spindle nut drive that any process forces which act on the end effector do not exert a resulting force on the spindle in a direction transversely with respect to the geometric spindle axis. This means that a positional accuracy which might trace back to possible bending of the spindle does not occur.

In the static state of the part kinematic mechanism, that is to say in the case of a fixed linear drive, the robot joint and the two coupler joints together with the coupler and the respective sections of the robot joints which lie between the coupler joints and the robot joint form an arrangement in the manner of a bar triangle, the corners of which are defined by way of the robot joint and by way of the coupler joints, the triangular area being oriented transversely with respect to the geometric axis of the robot joint.

Various embodiments relate to an articulated robot, which refinements are equipped with two part kinematic mechanisms in accordance with the proposal. In some embodiments, a common robot limb is assigned both to the first and the second part kinematic mechanism. More than two part kinematic mechanisms in accordance with the proposal can also fundamentally be provided, which part kinematic mechanisms can of course be parameterized differently.

Various embodiments provide an articulated robot having a serial kinematic mechanism for positioning an end effector, the kinematic mechanism having at least one part kinematic mechanism with a robot joint, with a robot limb which is mounted upstream of the robot joint, and with a robot limb which is mounted downstream of the robot joint, wherein the at least one part kinematic mechanism has, in order to adjust the robot limbs with respect to one another, a linear drive, with a drive element which can be adjusted along a linear axis, and a coupler with two coupler joints which are spaced apart from one another along the coupler extent, wherein the linear drive is arranged on a first robot limb of the part kinematic mechanism, and wherein the coupler is articulated on one side on the drive element of the linear drive and on the other side on the second, remaining robot limb of the part kinematic mechanism, spaced apart from the geometric axis of the robot joint of the part kinematic mechanism.

In some embodiments, the linear drive is a spindle/spindle nut drive with a spindle and a spindle nut, and wherein the drive element comprises the spindle nut or the spindle, and, in some embodiments, the system comprising the spindle and the spindle nut is configured as a ball bearing spindle system or as a planetary roller screw drive system.

In some embodiments, the spindle is mounted on the first robot limb of the part kinematic mechanism in such a way that the geometric spindle axis lies in a stationary manner on the first robot limb of the part kinematic mechanism.

In some embodiments, the spindle is mounted in an axially fixed but rotatable manner on the first robot limb of the part kinematic mechanism, and wherein the spindle nut is mounted in an axially movable but non-rotatable manner on the first robot limb of the part kinematic mechanism, in some embodiments spindle drive for driving the spindle is provided, such as wherein the spindle drive is configured as a servo drive.

In some embodiments, a longitudinal guide is arranged on the first robot limb of the part kinematic mechanism, such as separately from the linear drive, by means of which longitudinal guide the drive element is guided longitudinally in a guide direction on the first robot limb, and in some embodiments, wherein the longitudinal guide exerts guide forces on the drive element in all directions transversely with respect to the guide direction.

In some embodiments, for the static state of the part kinematic mechanism, the robot joint and the two coupler joints together with the coupler and the respective sections of the robot limbs which lie between the coupler joints and the robot joint configure an arrangement in the manner of a bar triangle.

In some embodiments, the force action lines which are assigned to the bar triangle configure a force action triangle, the corners of which are defined by way of the robot joint and by way of the coupler joints, and the internal angles of which in a working range of the articulated robot are (such as at all times) in each case greater than 15°, such as greater than 20°, such as greater than 30°, and/or wherein the internal angle on the coupler joint which faces away from the drive element in a working range of the articulated robot is (such as at all times) less than 150°, such as less than 140°, such as less than 120° and such as less than 100°.

In some embodiments, the kinematic mechanism has a first part kinematic mechanism of the at least one part kinematic mechanism and a second part kinematic mechanism of the at least one part kinematic mechanism, the second part kinematic mechanism being mounted downstream of the first part kinematic mechanism, in some embodiments wherein that robot limb of the first part kinematic mechanism which is mounted downstream is at the same time that robot limb of the second part kinematic mechanism which lies upstream and therefore provides a common robot limb of the two part kinematic mechanisms, and further, in some embodiments, wherein the linear drives of the two part kinematic mechanisms are arranged on the common robot limb.

In some embodiments, that first robot limb of the first part kinematic mechanism which has the linear drive is at the same time that first robot limb of the second part kinematic mechanism which has the linear drive and therefore provides the common robot limb of the two part kinematic mechanisms.

In some embodiments, that first robot limb of the first part kinematic mechanism which has the linear drive is mounted downstream of the second robot limb of the first part kinematic mechanism, and wherein that first robot limb of the second part kinematic mechanism which has the linear drive is mounted upstream of the second robot limb of the second part kinematic mechanism.

In some embodiments, the linear axes of the two part kinematic mechanisms are oriented spaced apart from one another, but parallel to one another.

In some embodiments, the end effector is configured as a riveting unit, as a handling unit or as a fiber laying unit.

BRIEF DESCRIPTION OF THE DRAWINGS

In the following text, the disclosure will be described in greater detail using a drawing which illustrates merely one exemplary embodiment and in which.

DETAILED DESCRIPTION

Figure 1:
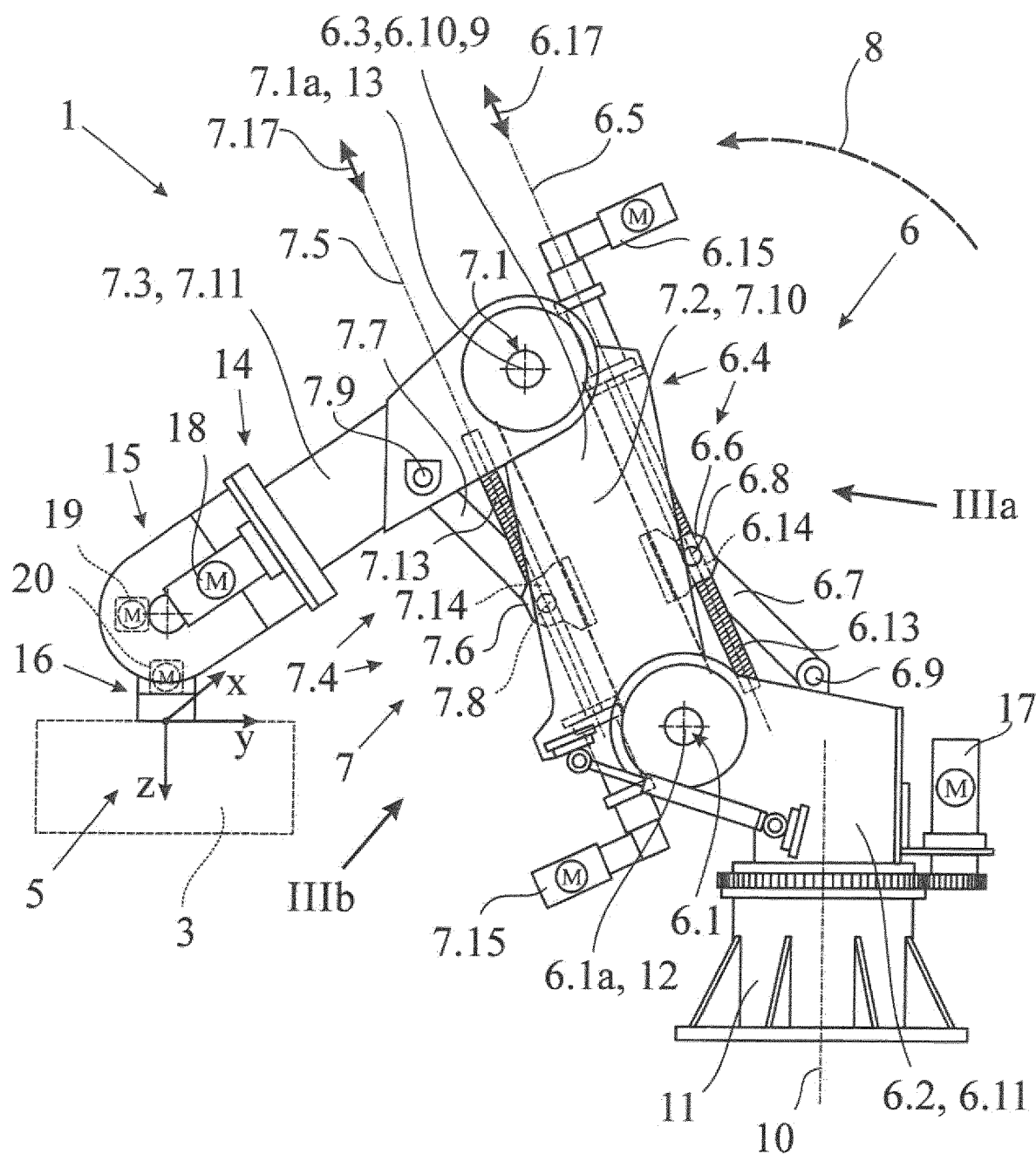
FIG. 1 shows an articulated robot in accordance with the proposal in a side view.

The articulated robot 1 which is shown in the drawing is equipped with a serial kinematic mechanism 2 for positioning an end effector 3. FIG. 1 shows a reference coordinate system 4, relative to which the end effector 3, in particular a tool coordinate system 5 on the end effector 3, can be mounted.

In the present case, the kinematic mechanism 2 of the articulated robot 1 comprises at least one part kinematic mechanism 6, 7 (here precisely two part kinematic mechanisms 6, 7 in accordance with the proposal). The two part kinematic mechanisms 6, 7 are of fundamentally identical structure, but can be parameterized differently. This results, for example, from the illustration in accordance with FIG. 1.

In the following text, the first part kinematic mechanism 6 will be described primarily. All comments in this regard apply correspondingly to the second part kinematic mechanism 7. In particular, all features and advantages which are described for the first part kinematic mechanism can be applied to the second part kinematic mechanism 7 and vice versa.

The part kinematic mechanism 6 is equipped with a robot joint 6.1, with a robot limb 6.2 which is mounted upstream of the robot joint 6.1, and with a robot limb 6.3 which is mounted downstream of the robot joint 6.1. The terms "mounted upstream" and "mounted downstream" are related to a forward direction 8 which runs toward the end effector 3 along the serial kinematic mechanism 2. The two robot limbs 6.2 and 6.3 are pivotably connected to one another via the robot joint 6.1.

Figure 3:
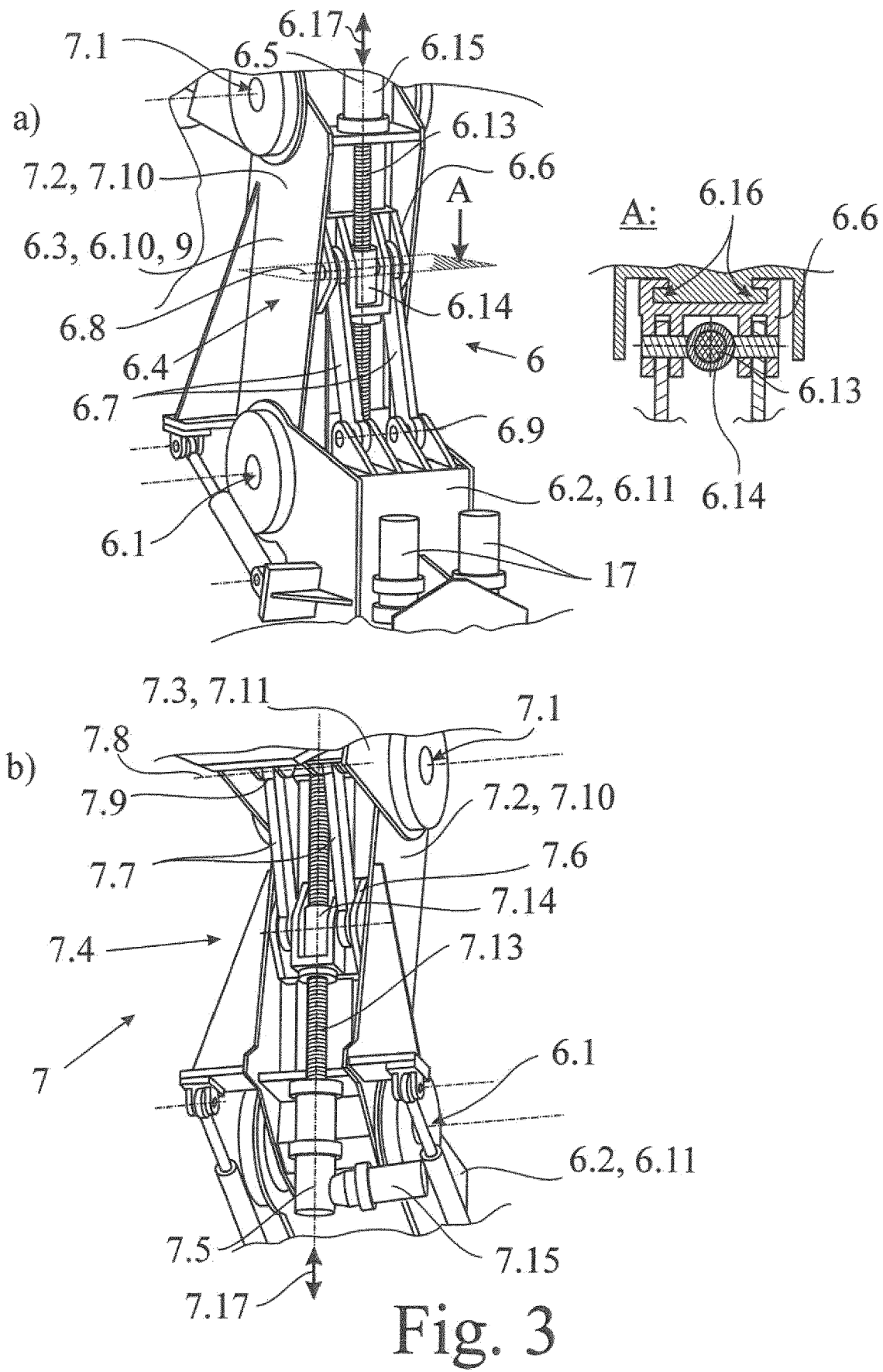
FIG. 3 shows the articulated robot in accordance with FIG. 1, in each case in a perspective view, a) in the viewing direction IIIa and b) in the viewing direction IIIb.

In order to adjust the robot limbs 6.2, 6.3 with respect to one another, the part kinematic mechanism 6 has a linear drive 6.4 with a drive element 6.6 which can be adjusted along a linear axis 6.5, and a coupler 6.7 with two coupler joints 6.8, 6.9 which are spaced apart from one another along the coupler extent. Here, the coupler 6.7 is configured as a double coupler with two individual couplers which run in parallel, as shown in FIG. 3a. In the present case, "coupler extent" means the longitudinal extent of the coupler 6.7.

The linear drive 6.4 is arranged on a first robot limb 6.10 of the part kinematic mechanism 6. Here, the first robot limbs 6.10 is one of the two robot limbs 6.2 and 6.3 which are mounted upstream and downstream.

The coupler 6.7 is arranged on one side on the drive element 6.6 of the linear drive 6.4 and on the other side on the second, remaining robot limb 6.11 of the part kinematic mechanism 6, to be precise spaced apart by a spacing 6.12 from the geometric axis 6.1a of the robot joint 6.1 of the part kinematic mechanism 6. Here, the second robot limb 6.11 is the other one of the two robot limbs 6.2 and 6.3 which are mounted upstream and downstream.

The result of the above is that an adjustment of the drive element 6.6 (shown in FIG. 1) on the robot limb 6.3 in an upward direction brings about a corresponding adjustment of the robot limb 6.3 in the clockwise direction, whereas an adjustment of the drive element 6.6 on the robot limb 6.3 in the downward direction generates a corresponding adjustment of the robot limb 6.3 counter to the clockwise direction.

The second part kinematic mechanism 7 is of corresponding construction and has a robot joint 7.1, a robot limb 7.2 which is mounted upstream, a robot limb 7.3 which is mounted downstream, a linear drive 7.4, the drive element 7.6 of which can be adjusted along the linear axis 7.5, a coupler 7.7 with two coupler joints 7.8 and 7.9, a first robot limb 7.1 and a second robot limb 7.11, and a corresponding spacing between the coupler joint 7.8 and the robot joint 7.1. The method of operation of the second part kinematic mechanism 7 corresponds to the method of operation of the first part kinematic mechanism 6, with the result that an adjustment of the drive element 7.6 in FIG. 1 in the upward direction generates a corresponding adjustment of the robot limb 7.3 in the clockwise direction, and an adjustment of the drive element 7.6 in FIG. 1 in the downward direction generates a corresponding adjustment of the robot limb 7.3 counter to the clockwise direction.

Figure 2:
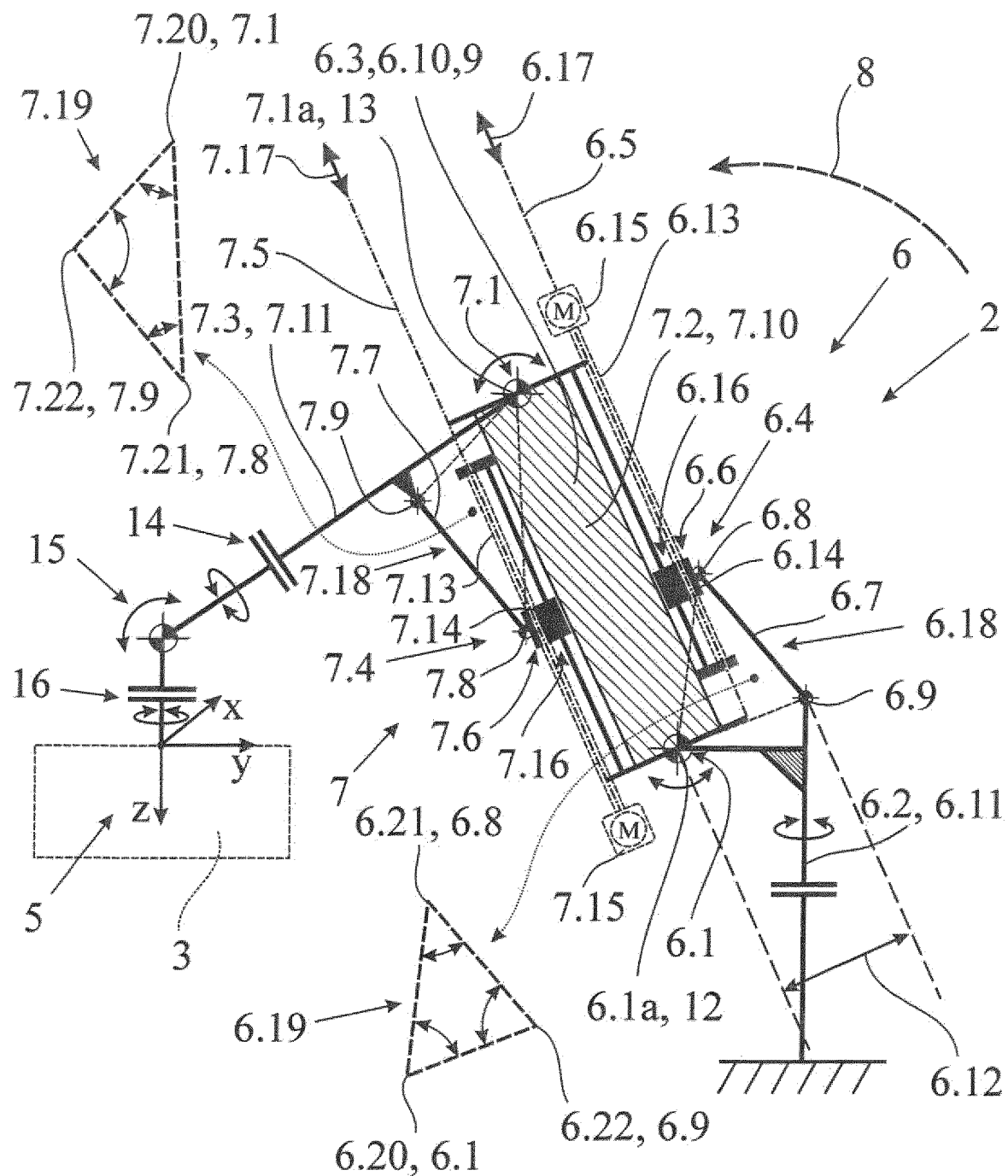
FIG. 2 shows the kinematic diagram of the articulated robot in accordance with FIG. 1.

FIG. 2 shows the kinematic mechanism 2 of the articulated robot 1 in accordance with the proposal in a diagrammatic illustration. It becomes clear here that the robot joint 6.1, the two coupler joints 6.8, 6.9 together with the coupler 6.7 and the respective sections of the robot limbs 6.2, 6.3 which lie between the coupler joints 6.8, 6.9 and the robot joint 6.1 and together with the linear drive 6.4 form a type of thrust crank kinematic mechanism. Here, the crank is as it were that section of the robot limb 6.2 which lies between the coupler joint 6.9 which faces away from the linear drive 6.4 and the robot joint 6.1.

In the case of the exemplary embodiment which is shown, the linear drive 6.4 is a spindle/spindle nut drive with a spindle 6.13 and a spindle nut 6.14, the drive element 6.6 comprising the spindle nut 6.14 or the spindle 6.13 (here, the spindle nut 6.14). In some embodiments, the system comprising the spindle 6.13 and the spindle nut 6.14 is configured as a ball bearing spindle system or as a planetary roller screw drive system. High loads can be adjusted with high accuracy specifically by way of the planetary roller screw drive system.

One aspect which is particularly interesting in terms of manufacturing technology in the case of the articulated robot 1 which is shown is the fact that the spindle 6.13 of the part kinematic mechanism 6 is mounted on that first robot limb 6.10 of the part kinematic mechanism 6 which has the linear drive 6.4, in such a way that the geometric spindle axis 6.13a lies in a stationary manner on the first robot limb 6.10 of the part kinematic mechanism 6. In detail, it is the case here that the spindle 6.13 is mounted on the first robot limb 6.10 of the part kinematic mechanism 6 such that it is fixed axially but can be rotated about the axial spindle axis 6.13a, the spindle nut 6.14 being mounted on the first robot limb 6.10 of the part kinematic mechanism 6 such that it can be moved axially but is non-rotatable in relation to the geometric spindle axis 6.13a. Here, a spindle drive 6.15 for driving the spindle 6.13 can be provided, which spindle drive 6.15 is configured in some embodiments as a servo drive, that is to say as a regulated drive. It is also advantageous with regard to the assembly of the spindle drive 6.15 that the spindle 6.14 (as addressed above) is arranged on the first robot limb 6.10 of the part kinematic mechanism 6.

The above comments with respect to the first part kinematic mechanism 6 relating to the refinement of the linear drive 6.4 as a spindle/spindle nut drive apply correspondingly to the second part kinematic mechanism 7. Here too, the components of the spindle 7.13, the spindle nut 7.14 and the spindle drive 7.15 which interact with one another in the above way are provided correspondingly.

A longitudinal guide 6.16 is arranged on the first robot limb 6.10 of the part kinematic mechanism 6, by means of which longitudinal guide 6.16 the drive element 6.6 is guided longitudinally in a guide direction 6.17 on the first robot limb 6.10. Here, the longitudinal guide 6.16 is configured separately from the linear drive 6.4. A guide in this context ensures not only the maintenance of the movement direction of the drive element 6.6 along the guide direction 6.17, but rather also prevents the drive element 6.6 lifting up from the guide. It is provided here that the longitudinal guide 6.16 exerts guide forces on the drive element 6.6, which guide forces are oriented both transversely with respect to the geometric axis 6.1a of the robot joint 6.1 and transversely with respect to the guide direction 6.17. It is even the case here that the longitudinal guide 6.16 exerts guide forces on the drive element 6.6 in all directions transversely with respect to the guide direction 6.17. The longitudinal guide 6.16 can be a flat guide. As an alternative, the longitudinal guide can also be a dovetail guide or a prism guide.

The second part kinematic mechanism 7 is equipped with a corresponding longitudinal guide 7.16 with an associated guide direction 7.17, which longitudinal guide 7.16 is once again functionally identical to the above-described longitudinal guide 6.16 of the first part kinematic mechanism 6.

The advantageousness of the kinematic mechanism 2 in accordance with the proposal can be best seen in the consideration of the static state of the relevant part kinematic mechanism 6, that is to say in the case of a fixed linear drive 6.4. It is essential here that the robot joint 6.1 and the two coupler joints 6.8, 6.9 together with the coupler 6.7 and the respective sections of the robot limbs 6.10, 6.11 which lie between the coupler joints 6.8, 6.9 and the robot joint 6.1 configure an arrangement in the manner of a rod triangle 6.18 for the static state of the part kinematic mechanism 6. The force action lines which are assigned to the rod triangle 6.18 configure a force action triangle 6.19, the corners of which are defined by way of the robot joint 6.1 and by way of the coupler joints 6.8, 6.9. A particularly stable arrangement results from the fact that the internal angles thereof in an operating range of the articulated robot 1 are (in some embodiments at all times) in each case greater than 15°, such as greater than 20°, further such as greater than 30°. As an alternative or in addition, it is provided in this context that the internal angle on the coupler joint 6.9 which faces away from the drive element 6.6, in an operating range of the articulated robot 1, is (in some embodiments at all times) less than 150°, such as less than 140°, further such as less than 120° and further such as less than 100°.

All comments in respect of the first kinematic mechanism 6 relating to the rod triangle 6.18 apply correspondingly to the second part kinematic mechanism 7 which likewise configures an arrangement in the manner of a rod triangle 7.18. Accordingly, in addition to the rod triangle 7.18, the second part kinematic mechanism 7 exhibits a force action triangle 7.19 which has the corners 7.20, 7.21 and 7.22.

It is the case here that the second part kinematic mechanism 7 is mounted downstream of the first part kinematic mechanism 6, as can be best gathered from the illustration in accordance with FIG. 1. It can be the case here that that robot limb 6.3 of the first part kinematic mechanism 6 which is mounted downstream is at the same time that robot limb 7.2 of the second part kinematic mechanism 7 which is mounted upstream, with the result that said robot limb provides a common robot limb 9 of the two part kinematic mechanisms 6, 7. In some embodiments, the linear drives 6.4, 7.4 of the two part kinematic mechanisms 6, 7 are arranged on the common robot limb 9. It is correspondingly provided here that the spindles 6.13, 7.13, the spindle nuts 6.14, 7.14 and the spindle drives 6.15, 7.15 are arranged in each case on the common robot limb 9.

As can be gathered, furthermore, from the illustration in accordance with FIG. 1, it can be correspondingly provided that that first robot limb 6.10 of the first part kinematic mechanism 6 which has the linear drive 6.4 is at the same time that first robot limb 7.10 of the second part kinematic mechanism 7 which has the linear drive 7.4 and therefore provides the common robot limb 9 of the two part kinematic mechanisms 6, 7.

That first robot limb 6.10 of the first part kinematic mechanism 6 which has the linear drive 6.4 is mounted downstream of the second robot limb 6.11 of the first part kinematic mechanism 6. The first robot limb 6.10 is therefore that above-addressed robot limb 6.3 of the first part kinematic mechanism 6 which is mounted downstream, whereas the second robot limb 6.11 is that above-addressed robot limb 6.2 of the first part kinematic mechanism 6 which is mounted upstream.

Conversely, it is provided in the case of the second part kinematic mechanism 7 that the first robot limb 7.10 which has the linear drive 7.4 is mounted upstream of the second robot limb 7.11. Here, the first robot limb 7.10 is therefore the robot limb 7.2 which is mounted upstream in the above context, whereas the second robot limb 7.11 is the above-addressed robot limb 7.3 which is mounted downstream.

As a result, this means that the first part kinematic mechanism 6 is as it were operated inversely with respect to the second part kinematic mechanism 7, which results, inter alia, in the particularly compact overall design which is shown in FIG. 1. The above compactness is assisted further by virtue of the fact that the linear axes 6.5, 7.5 of the two part kinematic mechanisms 6, 7 are oriented spaced apart from one another, but parallel to one another.

The geometric axes 6.1*a* and 7.1*a* of the two robot joints 6.1 and 7.1 are here oriented parallel to one another. This allows a relatively large reach of the articulated robot 1 in the X-direction (shown in FIG. 1) of the reference coordinate system 4.

The two linear axes 6.5, 7.5 of the two part kinematic mechanisms 6, 7 can extend parallel to a connecting line between the geometric axes 6.1*a* and 7.1*a* of the two robot joints 6.1 and 7.1, said connecting line extending transversely with respect to the two robot axes 6.1*a* and 7.1*a*. Said parallel orientation with respect to one another can be implemented particularly simply in terms of manufacturing technology.

From the situation which is shown in FIG. 1, a process force in the negative Z-direction of the tool coordinate system 5 then brings about a torque about the robot joint 7.1 of the second part kinematic mechanism 7, which torque is supported via the coupler 7.7. As a result of the configuration of the above rod triangle 7.18, only a comparatively small force component is introduced via the coupler 7.7 into the linear drive 7.4 via the drive element 7.6 in the direction of the linear axis 7.5, with the result that the linear drive 7.4 has to apply a correspondingly small counterforce, in order to guarantee a high rigidity. The remaining force component transversely with respect to the linear axis 7.5 is introduced into the longitudinal guide 7.16 and to this extent does not generate any undesired deformations.

At the same time, the above process force in the negative Z-direction of the tool coordinate system 5 brings about a torque about the robot joint 6.1 of the first part kinematic mechanism 6, which torque is supported via the coupler 6.7. As a result of the configuration of the above rod triangle 6.18, only a comparatively small force component is introduced via the coupler 6.7 into the linear drive 6.4 via the drive element 6.6 in the direction of the linear axis 6.5, with the result that the linear drive 6.4 once again has to apply a correspondingly small counterforce, in order to guarantee a high rigidity. The remaining force component transversely with respect to the linear axis 6.5 is once again introduced into the longitudinal guide 6.16 and to this extent does not generate any undesired deformations.

It becomes clear here that the existence of the longitudinal guides 6.16 and 7.16 is given particular significance for the resulting rigidity of the articulated robot 1 overall.

The articulated robot 1 in accordance with the proposal can be configured as a six-axis articulated robot. It is the case here that the first geometric positioning axis 10 is an axis in the Y-direction of the reference coordinate system 4. The robot limb 6.2 can also be pivoted about the geometric positioning axis 10 with respect to a main body 11. The second positioning axis 12 and the third positioning axis 13 are provided by the geometric axes 6.1*a*, 7.1*a* of the robot joints 6.1, 7.1. The robot limb 7.3 is also adjoined in a manner which is customary per se by a fourth, a fifth and a sixth positioning axis 14, 15, 16 which are merely indicated in the drawing and are given a merely subordinate significance for the teaching in accordance with the proposal.

The first positioning axis 10 and the fourth, fifth and sixth positioning axes 14, 15, 16 are assigned axial drives 17-20. The axial drives 17-20 and/or the spindle drives 6.15, 7.15 can be equipped at least partially with two drive motors which are braced slightly with respect to one another at all times, in order to avoid a tolerance-induced play. Other alternatives for the reduction of tolerance-induced play are fundamentally conceivable.

The articulated robot 1 in accordance with the proposal can be used within the context of the performance of automation tasks relating to the manufacture of structural components of aircraft. The end effector 3 can be correspondingly a riveting unit, a handling unit or a fiber laying unit. Other refinements of the end effector 3 are conceivable.

The invention claimed is:

1. An articulated robot comprising:
   a serial kinematic mechanism for positioning an end effector, the kinematic mechanism comprising at least one part kinematic mechanism with a robot joint, with a robot limb which is mounted upstream of the robot joint, and with a robot limb which is mounted downstream of the robot joint,
   wherein the at least one part kinematic mechanism has, in order to adjust the robot limbs with respect to one another, a linear drive, with a drive element which can be adjusted along a linear axis, and a coupler with two coupler joints which are spaced apart from one another along the coupler extent, wherein the linear drive is arranged on a first robot limb of the part kinematic mechanism, and wherein the coupler is articulated on one side on the drive element of the linear drive and on the other side on the second, remaining robot limb of the part kinematic mechanism, spaced apart from the geometric axis of the robot joint of the part kinematic mechanism; and wherein a longitudinal guide is arranged on the first robot limb of the part kinematic mechanism by which the longitudinal guide the drive element is guided longitudinally in a guide direction on the first robot limb.

2. The articulated robot as claimed in claim 1, wherein the linear drive is a spindle/spindle nut drive with a spindle and a spindle nut, and wherein the drive element comprises the spindle nut or the spindle.

3. The articulated robot as claimed in claim 2, wherein the spindle is mounted on the first robot limb of the part kinematic mechanism in such a way that the geometric spindle axis lies in a stationary manner on the first robot limb of the part kinematic mechanism.

4. The articulated robot as claimed in claim 2, wherein the spindle is mounted in an axially fixed but rotatable manner on the first robot limb of the part kinematic mechanism, and wherein the spindle nut is mounted in an axially movable but non-rotatable manner on the first robot limb of the part kinematic mechanism.

5. The articulated robot as claimed in claim 4, further comprising: a spindle drive for driving the spindle.

6. The articulated robot as claimed in claim 2, wherein the system comprising the spindle and the spindle nut is configured as a ball bearing spindle system or as a planetary roller screw drive system.

7. The articulated robot as claimed in claim 1, wherein, for the static state of the part kinematic mechanism, the robot joint and the two coupler joints together with the coupler and the respective sections of the robot limbs which lie between the coupler joints and the robot joint configure an arrangement in the manner of a bar triangle.

8. The articulated robot as claimed in claim 7, wherein the force action lines which are assigned to the bar triangle configure a force action triangle, the corners of which are defined by way of the robot joint and by way of the coupler joints, and the internal angles of which in a working range of the articulated robot are in each case greater than 15°, and/or wherein the internal angle on the coupler joint which faces away from the drive element in a working range of the articulated robot is less than 150°.

9. The articulated robot as claimed in claim 7, wherein the force action lines which are assigned to the bar triangle configure a force action triangle, the corners of which are defined by way of the robot joint and by way of the coupler joints, and the internal angles of which in a working range of the articulated robot are at all times in each case greater than 15°, and/or wherein the internal angle on the coupler joint which faces away from the drive element in a working range of the articulated robot is at all times less than 150°.

10. The articulated robot as claimed in claim 7, wherein the force action lines which are assigned to the bar triangle configure a force action triangle, the corners of which are defined by way of the robot joint and by way of the coupler joints, and the internal angles of which in a working range of the articulated robot are in each case greater than 30°, and/or wherein the internal angle on the coupler joint which faces away from the drive element in a working range of the articulated robot is less than 100°.

11. The articulated robot as claimed in claim 1, wherein the kinematic mechanism has a first part kinematic mechanism of the at least one part kinematic mechanism and a second part kinematic mechanism of the at least one part kinematic mechanism, the second part kinematic mechanism being mounted downstream of the first part kinematic mechanism.

12. The articulated robot as claimed in claim 11, wherein that first robot limb of the first part kinematic mechanism which has the linear drive is at the same time that first robot limb of the second part kinematic mechanism which has the linear drive and therefore provides the common robot limb of the two part kinematic mechanisms.

13. The articulated robot as claimed in claim 11, wherein that first robot limb of the first part kinematic mechanism which has the linear drive is mounted downstream of the second robot limb of the first part kinematic mechanism, and wherein that first robot limb of the second part kinematic mechanism which has the linear drive is mounted upstream of the second robot limb of the second part kinematic mechanism.

14. The articulated robot as claimed in claim 11, wherein linear axes of the first and second part kinematic mechanisms are oriented spaced apart from one another, but parallel to one another.

15. The articulated robot as claimed in claim 11, wherein that robot limb of the first part kinematic mechanism which is mounted downstream is at the same time that robot limb of the second part kinematic mechanism which lies upstream and therefore provides a common robot limb of the two part kinematic mechanisms.

16. The articulated robot as claimed in claim 15, wherein the linear drives of the two part kinematic mechanisms are arranged on the common robot limb.

17. The articulated robot as claimed in claim 1, wherein the end effector is configured as a riveting unit, as a handling unit or as a fiber laying unit.

18. The articulated robot as claimed in claim 1, wherein the longitudinal guide exerts guide forces on the drive element in all directions transversely with respect to the guide direction.

19. An articulated robot comprising:
a serial kinematic mechanism for positioning an end effector, the kinematic mechanism comprising at least one part kinematic mechanism with a robot joint, with a robot limb which is mounted upstream of the robot joint, and with a robot limb which is mounted downstream of the robot joint;

wherein the at least one part kinematic mechanism has, in order to adjust the robot limbs with respect to one another, a linear drive, with a drive element which can be adjusted along a linear axis, and a coupler with two coupler joints which are spaced apart from one another along the coupler extent, wherein the linear drive is arranged on a first robot limb of the part kinematic mechanism, and wherein the coupler is articulated on one side on the drive element of the linear drive and on the other side on the second, remaining robot limb of the part kinematic mechanism, spaced apart from the geometric axis of the robot joint of the part kinematic mechanism; and wherein, for the static state of the part kinematic mechanism, the robot joint and the two coupler joints together with the coupler and the respective sections of the robot limbs which lie between the coupler joints and the robot joint configure an arrangement in the manner of a bar triangle.

20. An articulated robot comprising:
a serial kinematic mechanism, without a parallel mechanism, for positioning an end effector, the kinematic mechanism comprising at least one part kinematic mechanism with a robot joint, with a robot limb which is mounted upstream of the robot joint, and with a robot limb which is mounted downstream of the robot joint; wherein the at least one part kinematic mechanism has, in order to adjust the robot limbs with respect to one another, a linear drive, with a drive element which can be adjusted along a linear axis, and a coupler with two coupler joints which are spaced apart from one another along the coupler extent, wherein the linear drive is arranged on a first robot limb of the part kinematic mechanism, and wherein the coupler is articulated on one side on the drive element of the linear drive and on the other side on the second, remaining robot limb of the part kinematic mechanism, spaced apart from the geometric axis of the robot joint of the part kinematic mechanism.

* * * * *